United States Patent
Rabbah et al.

(10) Patent No.: US 10,896,181 B2
(45) Date of Patent: Jan. 19, 2021

(54) SERVERLESS COMPOSITION OF FUNCTIONS INTO APPLICATIONS

(71) Applicant: International Business Machines Corporation, Armonk, NY (US)

(72) Inventors: Rodric Rabbah, Somers, NY (US); Nicholas M. Mitchell, White Plains, NY (US); Stephen Fink, Yorktown Heights, NY (US); Olivier L. J. Tardieu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 15/725,756

(22) Filed: Oct. 5, 2017

(65) Prior Publication Data

US 2019/0108259 A1 Apr. 11, 2019

(51) Int. Cl.
*G06F 16/00* (2019.01)
*G06F 16/2455* (2019.01)
*G06F 16/953* (2019.01)
*G06F 16/242* (2019.01)

(52) U.S. Cl.
CPC ........ *G06F 16/2455* (2019.01); *G06F 16/242* (2019.01); *G06F 16/953* (2019.01)

(58) Field of Classification Search
CPC .. G06F 16/2455; G06F 16/953; G06F 9/5027; G06F 16/248; G06F 9/5077; G06F 16/242
See application file for complete search history.

(56) References Cited

U.S. PATENT DOCUMENTS

| | | | |
|---|---|---|---|
| 5,495,606 A * | 2/1996 | Borden | G06F 15/17375 |
| 6,944,662 B2 | 9/2005 | Devine et al. | |
| 8,990,212 B1 * | 3/2015 | Zenger | G06F 16/2282 707/737 |
| 9,229,768 B2 | 1/2016 | Schnurr et al. | |
| 2013/0262436 A1 * | 10/2013 | Barsness | G06F 16/24549 707/718 |
| 2013/0275410 A1 * | 10/2013 | Atedgi | G06F 16/9024 707/722 |
| 2015/0193719 A1 * | 7/2015 | Than | G06Q 10/105 705/7.39 |
| 2016/0378827 A1 * | 12/2016 | Bondalapati, Sr. | G06F 16/24542 707/718 |
| 2017/0061550 A1 * | 3/2017 | Lin | G06Q 50/01 |

(Continued)

OTHER PUBLICATIONS

Anonymous, "A method for remote online usage tracking for serverless mobile applications", An IP.com Prior Art Database Technical Disclosure, IP.com Electronic Publication Date: Mar. 6, 2014, IP.com No. IPCOM000235534D, 3 pages.

(Continued)

*Primary Examiner* — Alexander Khong
(74) *Attorney, Agent, or Firm* — Gilbert Harmon, Jr.; Jared L. Montanaro

(57) ABSTRACT

A processor may receive a query from a user. The query may include one or more portions. The processor may identify a primary function. The processor may determine to segment the primary function into two or more subsidiary functions. The processor may process a first portion of the query with a first subsidiary function. The processor may display a processed outcome of the query to the user.

20 Claims, 7 Drawing Sheets

(56) References Cited

U.S. PATENT DOCUMENTS

2017/0116289 A1* 4/2017 Deshmukh ........ G06F 16/24535
2017/0147708 A1* 5/2017 Lo ..................... G06F 16/24558
2018/0096035 A1* 4/2018 Kreutzer ............. G06F 16/9024
2018/0375712 A1* 12/2018 Krohling ........... H04L 29/08711

OTHER PUBLICATIONS

IBM, "An autonomic system and method for automated rule composition based on artifact contents", An IP.com Prior Art Database Technical Disclosure, IP.com Electronic Publication Date: Aug. 25, 2005, IP.com No. IPCOM000127362D, 5 pages.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

SERVERLESS COMPOSITION OF FUNCTIONS INTO APPLICATIONS

BACKGROUND

The present disclosure relates generally to the field of functions-as-a-service (FaaS), and more specifically to managing cloud native applications in a way that shift the burden of managing the servers to a cloud platform operator (i.e., serverless computing).

Serverless computing, of which functions-as-a-service is one example, has rampantly become a cloud-based tool for supporting scalable, event-driven applications. FaaS computing allows for the use of short-running, generally stateless, functions that can be triggered by events.

SUMMARY

Embodiments of the present disclosure include a method, computer program product, and system for processing queries by composing multiple stateless or stateful functions together. A processor may receive a query from a user. The query may include one or more portions. The processor may identify a primary function. The processor may determine to segment the primary function into two or more subsidiary functions. The processor may process a first portion of the query with a first subsidiary function. The processor may display a processed outcome of the query to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
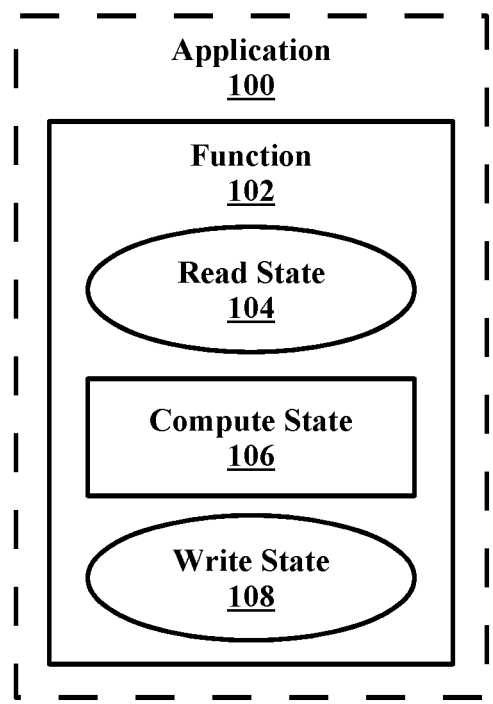
FIG. 1A depicts an example of processing of a function-as-a-service application, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of cloud computing, and more specifically to severless computing; in general, serverless refers to shifting the burden of the operating and managing servers from the consumer to the cloud provider, and offering pay-as-you and for what you use billing, at fine grained time increments, minimizing or not charging for idle time, and scaling resources automatically based on application needs. While the present disclosure is not necessarily limited to such applications, various aspects of the disclosure may be appreciated through a discussion of various examples using this context.

A user (e.g., a developer, a customer, etc.) may desire to manage overhead by not directly specializing hardware (e.g., creating or utilizing specific servers and/or computers for a single purpose) to host a particular application. The user may turn to cloud-based serverless hosting, which may allow the user the host their particular application without the need for explicitly provisioning specialized hardware. The user may still desire to manage overhead by not having their particular application constantly running (thereby increasing the overhead costs of managing the application) on the (cloud-based) server hosting the particular application. The user may turn to reactive or trigger-based execution of fine grained functions, which are generally stateless, to diminish overhead (e.g., by only running on a processor when an event trigger the function) and additionally increase the processing speed and efficiency of their particular application (e.g., by utilizing the parallel nature associated with stateless functions).

In some embodiments, a processor may receive a query from a user. In some embodiments, the query may include one or more portions. The processor may identify a primary function. In some embodiments, the primary function may be an application. The processor may determine to segment the primary function into two or more subsidiary functions. In some embodiments, the two or more subsidiary functions may each process a portion of the query (e.g., a first subsidiary function may process a first portion, a second subsidiary function may process a second portion, etc.). In some embodiments, the processor may process a first portion of the query with a first subsidiary function. The processor may display a processed outcome of the query (e.g., the outcome generated after the query has been fully processed by the two or more subsidiary functions) to the user.

In some embodiments, the order in which the processor may process the outcome of the query may or may not matter. For example, two or more portions of a query may sequentially be processed, e.g., a result may be generated for the first portion processed by a first subsidiary function and stored for use by a second subsidiary function to process a second portion. Or, the first subsidiary function may process the first portion in parallel to the second subsidiary function processing the second portion.

For example, a user operating a laptop that is connected to the Internet may input a query into a cloud server, which limits the processing of queries to one minute. The user may be searching for a detailed analysis of the most efficient table turnover rate for a restaurant. The query for "most efficient table turnover rate for a restaurant" may trigger a processor in the cloud server to search the entirety of the cloud server's storages for a primary function associated with table turnover rates. The primary function may be identified with a metadata tag indicating the table turnover rate association. The processor may determine that the primary function is too large to process the query within one minute because the primary function, in addition to providing table turnover rates, may produce other restaurant operating diagnostics (e.g., such as price points of food, drinks, etc.).

The processor may, in response to determining that the primary function is too large to process the query within one minute, segment the primary function into two or more subsidiary functions. The processor may identify that one of the subsidiary functions is the function for table turnover rates and process the query using table turnover rate function. The processor may then display the table turnover rate to the user.

In some embodiments, the processor may determine to segment the primary function into two or more subsidiary functions by receiving a callback after completion of the primary function. That is, the processor may receive an indication that the primary function did not process in an allotted amount of time (e.g., is too large to process as a single function, etc.) and that the primary function should be "called-back" in the form of the two or more subsidiary functions. In some embodiments, the processor may receive an indication that the primary function was fully processed, thus, the primary function does not need to be segmented and the processing of the primary function may end.

In some embodiments, upon receiving a query, the processor may search the cloud server directly for one or more functions (e.g., primary, subsidiary, etc.) associated with the query and compose the one or more functions together to process the query. That is, in some embodiments, the processor may not segment a primary function; instead, the processor may begin processing a query by identifying a function that may process a portion of the query and use the output of the function from the portion of the query to identify a second function, and so forth, until the query is fully processed.

In some embodiments, processor may identify that the first portion of the query has been processed. In some embodiments, the processor may identify that the first portion of the query has been processed by the first subsidiary function generating a first output. In some embodiments, the processor may determine that a second portion of the query remains unprocessed. In some embodiments, the processor may process the second portion of the query with a second subsidiary function. In some embodiments, the processor may determine that the second portion of the query remains unprocessed by identifying that the first output is a first input for the second subsidiary function.

In some embodiments, the processor may identify that the second portion of the query has been processed. In some embodiments, the processor may identify that the second portion of the query has been processed by the second subsidiary function generating a second output. In some embodiments, the processor may determine that a third portion of the query remains unprocessed. In some embodiments, the processor may process the third portion of the query with a third subsidiary function. In some embodiments, the process may generate the processed outcome of the query.

For example, a processor in cloud server may receive a query from a user looking to find the reflux ratio of a distillation column (e.g., the amount of distillate collected in a receiver versus the amount of product re-distilled) while only knowing the percent of vapors is 0.4 (e.g., V=0.4). To find the reflux ratio, the processor may search the cloud server for a primary function relating to reflux ratios. The processor may identify the primary function as having multiple sets of subsidiary functions relating to reflux ratios and determine to separate the subsidiary functions. The subsidiary functions may be that Reflux Ratio=Liquid/Distillate (i.e., R=L/D); Liquid+Vapor=1 (i.e., L+V=1); and Distillate=Vapor/Liquid (D=V/L).

The processor may the begin processing a portion of the query using the subsidiary function of L+V=1 (e.g., first subsidiary function) and determine an output of the subsidiary function is L=0.6 (i.e., L=1-V, where V is 0.4). The processor may identify that L=0.6 may be used by the subsidiary function of D=V/L (e.g., the second subsidiary function).

The processor may then process a second portion of the query using the subsidiary function D=V/L and determine an output of the second subsidiary function is D=0.67 (e.g., D=0.4/0.6). The processor may identify that D=0.67, now with L=0.6 may be used by the subsidiary function of R=L/D (e.g., the third subsidiary function).

The processor may then process a third portion of the query using the subsidiary function of R=L/D, knowing L=0.6 and D=0.67. The processor may determine that the Reflux Ratio=0.896 (e.g., R=0.6/0.67). The program may identify 0.896 as the processed outcome of the reflux ratio query and display the reflux ratio of the distillation column to a user.

In some embodiments, the processor may register (e.g., save, tag for future use, indicate with an identifier, etc.) the composed together subsidiary functions as an application. For example, the processor may identify the subsidiary function of Liquid+Vapor=1, composed with the subsidiary function of Distillate=Vapor/Liquid, composed with the subsidiary function of Reflux Ratio=Liquid/Distillate is an application.

In some embodiments, the processor may identify the primary function by accessing a database (e.g., a cloud-server, a repository, a computer hard drive, etc.). In some embodiments, the database may include source code for one or more primary functions. In some embodiments, the processor may identify the primary function as being able to process the query. In some embodiments, the processor may identify the primary function as being able to process the query by identifying that the primary function has an identifier associated with a primary article (e.g., word, image, etc.) of the query.

For example, a user may input a query into a program connected to a cloud-environment and a processor in a part of the cloud environment may receive the query. The query may be "how to make cookies." The processor may parse the query into individual words and be programmed to disregard functional words (e.g., "how" and "to" from the query) and focus on verbs (e.g., "make" from the query) and nouns (e.g., "cookies" from the query).

The processor may identify the primary article of the query is "making cookies" and access the cloud environment to which the processor belongs. The processor may search the cloud environment for primary functions that are tagged (e.g., with metadata, an indicator, etc.) with cookie making tutorials and the like. In some embodiments, the processor may identify the primary functions most associated with the query and automatically process, in parallel (e.g., at the same time, simultaneously, etc.), the query using each primary function. In some embodiments, the processor may display a processed outcome of the query to the user based on which primary function was fastest at processing the query.

In some embodiments, the processor may determine to segment the primary function into two or more subsidiary functions by determining that the primary function will not process the query within a time threshold. In some embodiments, the processor may determine that the primary function will not process the query within the time threshold by executing the primary function in a sandbox environment. In some embodiments, the processor may determine that the primary function will not process the query within the time threshold by executing the primary function.

For example, a processor may be queried to determine the circumference of a circle having a radius of 5 (e.g., R=5). Additionally, the processor may have a time constraint imposed, which only allows the processor to process functions that take less than 0.001 seconds to process. The processor may identify (e.g., by accessing a database and identifying associated tags) two primary functions associated with finding circumference. The two primary functions may be: Circumference=pi*Diameter (e.g., C=π*D) or Circumference=2*pi*Radius (e.g., C=2*π*R). The processor may simultaneously process (e.g., execute) both primary functions to find the circumference.

The processor may identify that during the processing, that the processor only has information for the radius, and the processing for the circumference using diameter now takes an additionally step (e.g., a subsidiary function of multiplying 2*R) before using the pi*Diameter primary function. The processor may finish processing the pi*Diameter primary function and determine that it takes longer than 0.001 seconds (e.g., the time threshold). The processor may then choose to only process the query using the 2*pi*Radius primary function to find the circumference because it is the faster equation to process.

In some embodiments, simultaneously processing two or more functions (e.g., primary and/or subsidiary functions) at once and proceeding with the fastest function may reduce the cost of running an application as a cloud-based service. For example, simultaneously processing two or more functions may utilize the same costs (e.g., hardware, economic, etc.) associated with that of processing one function because the resources already being allocated to on function do not require any additional resources to process another function simultaneously. Additionally, if one function is found to be more efficient (e.g., processed faster), the total cost of processing the query may be mitigated because less hardware usage is required.

In some embodiments, the processor may learn which functions (e.g., primary and/or subsidiary) are more efficient depending on inputted data. Following the example above, the processor may have learned that processing for the circumference of a circle when only having the radius, only requires the primary function of 2*pi*Radius. The processor may no longer simultaneously try to process the primary functions of 2*pi*Radius and pi*Diameter. In some embodiments, the learning of which functions to forgo may lower costs (e.g., computing resource costs such as processing time, memory usage, etc. and economic costs) associated with running an application.

In some embodiments, the processing of the query may be done in one language (e.g., monoglot) using any programming language, such as, but not limited to JAVA, SWIFT, PYTHON, etc.), or as native binaries. In some embodiments, one of the subsidiary functions used to process the query may be a function relating to a programming language that is different from the other programming languages used by the other subsidiary function(s). The processor may run subsidiary functions that use different programming languages at the same time or on specialized hardware if it is determined by a user or the processor that it is more effective to do so. This may allow for the query to be more efficiently and quickly processed.

For example, one subsidiary function may be programmed in JAVA, whereas another subsidiary function, which may be a part of the same query, may be programmed in PYTHON; this may be dictated by the original coder finding it easier to program one function in one language and anther function in another language. The processor may decide to simultaneously process a first portion of the query using JAVA and a second portion of the query using PYTHON. This may allow the processor to more efficiently and more quickly relay at processed outcome of the query to a user instead of transforming the output of one function in one language to another language in order for the output to be used as an input in the other language.

Referring now to FIG. 1A, depicted is an example of processing a function-as-a-service application 100, in accordance with embodiments of the present disclosure. In some embodiments, the application 100 may be stored in a cloud-computing environment. In some embodiments, the application 100 may be a primary function. In some embodiments, the application 100 may include (e.g., be comprising of) a function 102 (e.g., a primary function). In some embodiments, the function 102 may include a read state 104, a compute state 106, and a write state 108. In some embodiments, each state 104-108 may be processed on a respective processor included in the cloud-computing environment (e.g., a first processor for the read state 104, a second processor for the compute state 106, and a third processor for the write state 108).

In some embodiments, the application 100 may receive a query and the query may trigger the application 100 to begin processing the query using the function 102. In some embodiments, upon determining to process the query using the function 102, all three processors associated with the states 104-108 may be activated and dedicated to the processing of the query. In some embodiments, the three processors may be active for the entire processing of the query using the function 102.

That is, for example, as the query is being processed, the read state 104 running on the first processor may be the only state processing a first portion of the query, however, the other two processors are still active. This may hinder the cloud-computing environment from allocating the processors to perform another task while waiting for the read state 104 to process its portion of the query.

In some embodiments, the read state 104 may finish processing the first portion of the query, outputting a result that may allow the compute state 106 to begin processing a second portion of the query on the second processor. In some embodiments, the first processor may still be active even though the read state 104 has finished processing the first portion of the query. Additionally, the third processor may be active, waiting for an output from the compute stage 106 in order to invoke the write state 108.

In some embodiments, the compute state 106 may finish processing the second portion of the query on the second processor and output a result that may allow the write state 108 to begin processing a third portion of the query on the third processor. In some embodiments, the first and second processors may still be active even though the read state 104 and the compute state 106 have finished processing the first and second portions of the query. This again may hinder the ability of the cloud-computing environment to allocate the processors elsewhere when not being used for processing of data.

In some embodiments, the write state 108 may finish processing the third portion of the query on the third processor and the function 102 may have fully processed the query. In some embodiments, the application 100 may identify that the query is fully processed and output the result of the query to a user. During the time of the full processing, all three processors may be activated and dedicated to the one query regardless of if one or more of the processors are actively processing a portion of the query.

Figure 1B:
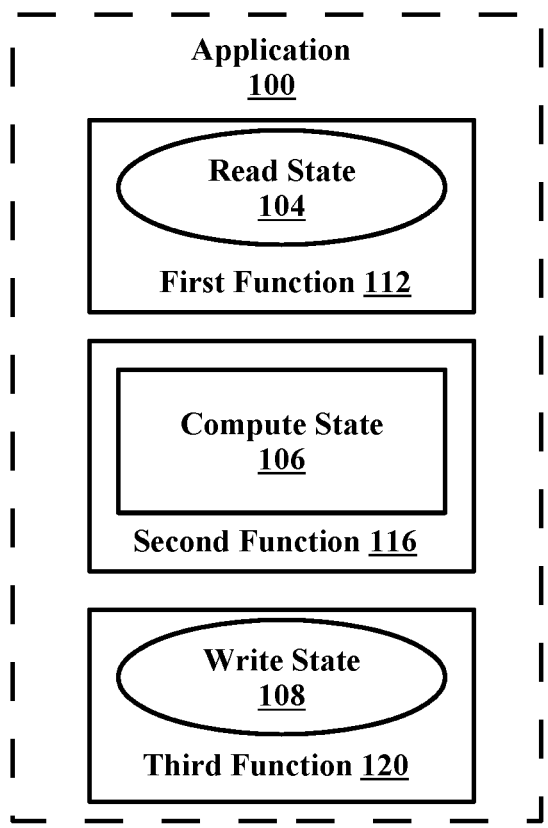
FIG. 1B depicts an example processing of the function-as-a-service application of FIG. 1A after the primary function has been split into three distinct functions, in accordance with embodiments of the present disclosure

Referring now to FIG. 1B, depicted is an example of processing the function-as-a-service application 100 of FIG. 1A after the primary function has been split into three distinct functions 112, 116, and 120, in accordance with embodiments of the present disclosure. Like reference numerals are used to designate like parts of in the accompanying drawings. In some embodiments, the application 100 may be stored in a cloud-computing environment. In some embodiments, the application 100 may be a primary function.

In some embodiments, the application 100 may include (e.g., comprising of) a first function 112, a second function 116, and a third function 120. In some embodiments, the first through third functions 112, 116, and 120 may be subsidiary functions of the function 102 of FIG. 1A. In some embodiments, the application 100, upon receiving a query, may separate the function 102 into the first through third functions 112, 116, and 120 by corresponding each of the first through third functions 112, 116, and 120 respectively to one of the states 104, 106, and 108.

In some embodiments, the function 102 may be prescribed when to separate into the third through third functions 112, 116, and 120 and which states the first through third functions 112, 116, and 120 should correspond to. For example, a programmer may code the function 102 to only separate into subsidiary functions upon a certain input. Additionally, upon the certain input the subsidiary functions may be designated to correspond to certain states (e.g., the first function 112 could correspond to the compute state 106, etc.) In some embodiments, the first function 112 may include the read state 104 of FIG. 1A, the second function 116 may include the compute state 106 of FIG. 1A, and the third function 120 may include the write state 108 of FIG. 1A.

In some embodiments, the first function 112, the second function 116, and the third function may be the same or similar function as the function 102 as detailed in FIG. 1A. In some embodiments, each state 104-108 of the function 102 as detailed in FIG. 1A may be treated as a separate function and processed, respectively, as the first function 112, the second function 116, and the third function 120 of the present FIG. 1B. In some embodiments, the first function 112, the second function 116, and the third function 120 of FIG. 1B may be treated like and processed as the function 102 of FIG. 1A.

In some embodiments, each state 104, 106, and 108 may be processed on a respective processor included in the cloud-computing environment (e.g., a first processor for the read state 104, a second processor for the compute state 106, and a third processor for the write state 108). In some embodiments, the application 100 may receive a query and the query may trigger the application 100 to separate each state 104, 106, and 108 into the first through third functions 112, 116, and 120. In some embodiments, the application 100 may begin processing the query using the first function 112. In some embodiments, upon determining to process the query using the first function 112, only the first processor associated with the read state 104 may be activated and dedicated to the processing a first portion of the query. In some embodiments, the second and third processors remain inactive for application 100 during the processing of the first portion of query, allowing the second and third processors to be allocated for other applications and/or computing tasks until the first portion of the query is processed, greatly increasing the efficiency of the cloud-computing environment.

In some embodiments, the read state 104 may finish processing the first portion of the query, outputting a result that may trigger the second function 116 and allow the compute state 106 to begin processing a second portion of the query on the second processor. In some embodiments, the first processor may still be excused (e.g., terminated from use by the application 100) after the read state 104 has finished processing the first portion of the query. Allowing the first processor to be allocated for other applications and/or computing tasks. Additionally, the third processor may remain inactive, waiting for an output from the compute stage 106 in order to invoke the write state 108.

In some embodiments, the compute state 106 may finish processing the second portion of the query on the second processor and output a result that may trigger the third function 120 and allow the write state 108 to begin processing a third portion of the query on the third processor. In some embodiments, the first and second processors may be excused after the read state 104 and the compute state 106 have finished processing the first and second portions of the query. This again, may increase the efficiency of the cloud-computing environment by allowing the cloud-computing environment to allocate the processors elsewhere when not being used for the application 100.

In some embodiments, the write state 108 may finish processing the third portion of the query on the third processor and the function 120 may have fully processed the query. In some embodiments, the application 100 may identify that the query is fully processed and output the result of the query to a user. During the time of the full processing, only one of the three processors may be activated and dedicated to processing a portion of the query at a time.

In some embodiments, the processor may not invoke the application 100 at all. That is, one of the three processors associated with each state 104, 106, and 108 may be invoked by the cloud-computing environment in response to the cloud-computing environment receiving a query. The chosen processor may process a portion of the query and if a result is achieved with the portion of the query, another potion of the query may be processed on another of the three processors. In some embodiments, the cloud-computing environment may identify in which order the states 104, 106, and 108 produced an outcome for the query and the cloud-computing environment may store the order of the states 104, 106, 108 as their respective functions 112, 116, and 120 as the application 100. That is, the application 100 may not exist until it is generated by the cloud-computing environment determining which functions and/or states produce an outcome to a query.

Figure 2:
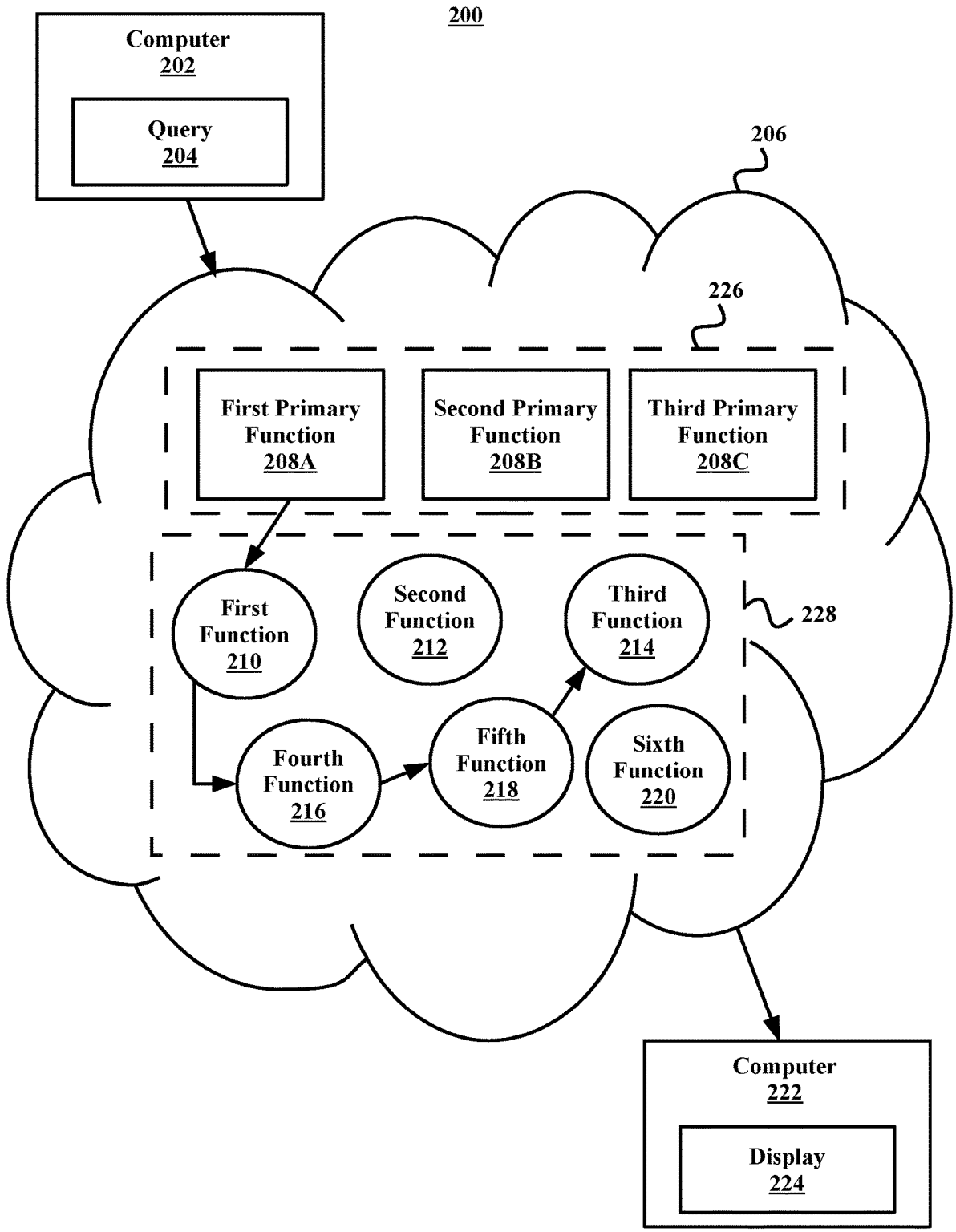
FIG. 2 illustrates an example computing environment for processing and displaying an outcome of a query, in accordance with embodiments of the present disclosure.

Referring now to FIG. 2, illustrated is an example computing environment 200 for processing and displaying an outcome of a query, in accordance with embodiments of the present disclosure. In some embodiments, the computing environment 200 may include a computer 202, a cloud 206, and a computer 222. In some embodiments, the computer 202 and the computer 222 may be the same computer. In some embodiments, the cloud 206 may include and/or be hosted on a remotely-located server or servers (e.g., processors, computers, etc.).

In some embodiments, the computer 202 may include a query 204, which may be inputted by a user. In some embodiments, the cloud 206 may include a first database 226 and a second database 228. In some embodiments, the first database 226 and the second database 228 may be partitioned using virtual machines. In some embodiments, the first database may include a first primary function 208A, a second primary function 208B, and a third primary function 208C. In some embodiments, the second database 228 may include a first function 210, a second function 212, a third function 214, a fourth function 216, a fifth function 218, and a sixth function 220. In some embodiments, the second database 228 may only be accessed through the first primary function 208A. In some embodiments, the first through sixth functions 210-220 may be subsidiary functions of the first primary function 208A. In some embodiments, the computer 222 may include a display 224 (e.g., a touch screen, an LCD/LED screen, etc.).

In some embodiments, the computer 202 may be operated by a user, and the user may input the query 204. The query 204 may be transmitted to and/or received by a processor associated with the cloud 206. In some embodiments, the processor may determine that the query 204 is directed to a primary article and the processor may access the first database 226. The processor may identify, using tags associated with the first through third primary functions 208A-C, that the primary article of the query is addressed by the first primary function 208A. In some embodiments, the query 204 may include a bypass instruction which may allow the processor to forgo identifying any primary function associated with the specific article of the query 204, and proceed directly to the first through sixth functions 210-220 that may be used to process the query 204.

In some embodiments, after identifying the first primary function 208A as being associated with the primary article of the query 204 the processor may access the first rule 208A and process the query 204 by using one or more of the first through sixth functions 210-220. In some embodiments, the processor may begin processing the query 204 by using the first function 210. In some embodiments, the first function 210 may process a first portion of the query 204, and the first function 210 may generate an outcome for the first portion of the query 204 that may act as a trigger for the fourth function 216.

In some embodiments, the processor may continue to process the query 204 by using the fourth function 216. In some embodiments, the fourth function 216 may process a second portion of the query 204, and the fourth function 216 may generate an outcome for the second portion of the query 204 that may act as a trigger for the fifth function 218.

In some embodiments, the processor may continue to process the query 204 by using the fifth function 218. In some embodiments, the fifth function 218 may process a third portion of the query 204, and the fifth function 218 may generate an outcome for the third portion of the query 204 that may act as a trigger for the third function 214.

In some embodiments, the processor may finish processing the query 204 using the third function 214. In some embodiments, the third function 214 may process a fourth portion of the query 204, and the third function 214 may generate a processed outcome for the query 204. In some embodiments, the processor may send the processed outcome to the computer 222, and the computer 222 may display the processed outcome to the user on the display 224.

In some embodiments, the processor may determine in which order to process the functions 210-220 based on the outcome of the processed function. That is, the processor may not know which function will be processed next until an outcome is determined for the previous function and the outcome is used as a trigger for the subsequent function. In some embodiments, not all the functions 210-220 associated with the first rule 208A may be processed. Different functions of the function 210-220 may generated outcomes that are not usable as triggers by any of the functions 210-220.

For example, the query 204 may be about lathing metal and the first rule 208A may be about lathing. Each function 210-220 may be associated to the rule and identify certain facets of lathing, however the second function 212 and the sixth function 220 may only deal with lathing wood. Therefore, they were not triggered to be processed because they did not deal with metal lathing techniques.

In some embodiments, the first through sixth functions 210-220 may be a part of a state-machine (e.g., a processor), and as one portion of the query is processed with one of the functions, the state machine may transition to a new function (e.g., a level that is one of the remaining one through sixth functions 210-220). In some embodiments, when transitioning to the new function, the previous function may terminate completely, which in turn may reduce costs associated with processing the query.

Figure 3:
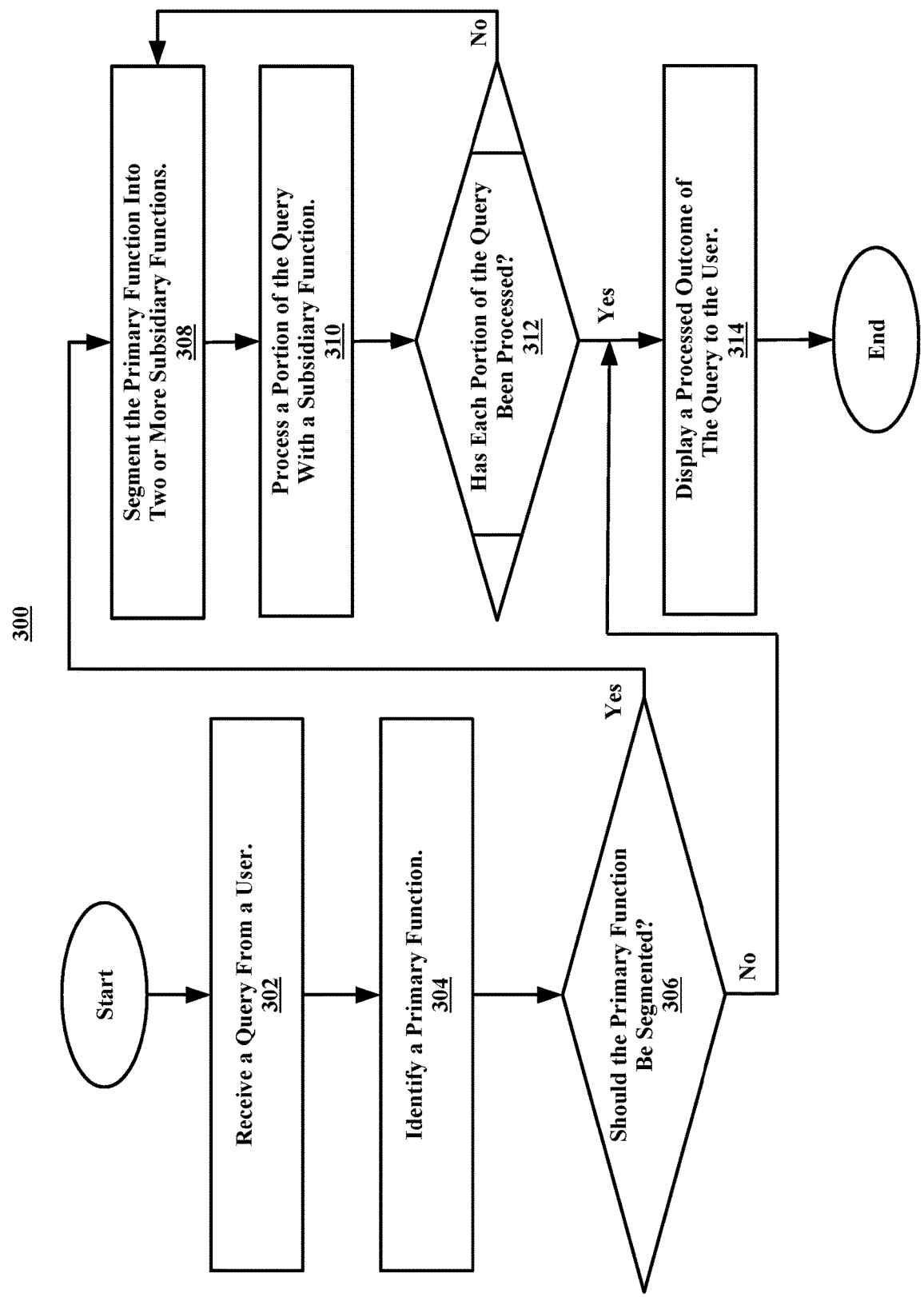
FIG. 3 illustrates a flowchart of an example method for processing a query using multiple subsidiary functions, in accordance with embodiments of the present disclosure.

Referring now to FIG. 3, illustrated is a flowchart of an example method 300 for processing a query using multiple subsidiary functions, in accordance with embodiments of the present disclosure. In some embodiments, the method 300 may be performed by a processor (e.g., on a computer, server, cloud-server, etc.).

In some embodiments, the method 300 may begin at operation 302. At operation 302, the processor may receive a query from a user. In some embodiments, the method 300 may proceed to operation 304. At operation 304, the processor may identify a primary function from a database.

In some embodiments, the method 300 may proceed to decision block 306. At decision block 306, the processor may determine if the primary function should be segmented into two or more subsidiary functions. In some embodiments, the processor may determine to segment the primary function into two or more subsidiary functions by determining that the primary function will not process the query within a time threshold.

For example, a processor located on a sever may receive a query for "Transitioning a Laplace Transform from Taylor Series," and have a 1 second threshold for outputting a response to the query. The processor may begin processing the query by identifying a primary article of the query as "Taylor Series" and analyze the server for data regarding Taylor Series. The processor, after narrowing the search to Taylor Series may then analyze the narrowed search for sub-information regarding "Laplace Transform." The processor may identify a technique (e.g., a primary function) for transitioning a Taylor Series into a Laplace Transform and execute the technique only to identify that the time threshold will be exceeded. The processor may then determine to separate the technique into three steps (e.g., subsidiary functions).

In some embodiments, the processor may determine if each subsidiary function will process a portion of the query within the time threshold. In some embodiments, at decision block 306 the processor may determine to segment the primary function even if only a portion of the subsidiary functions are needed to process the query. For example, the processor may receive a query for "finding the enthalpy of a reaction." The processor may access a science database and identify a primary function in the database relating to "thermodynamics," which may include enthalpy equations, entropy equations, fugacity equations, etc. (e.g., subsidiary functions). The processor may determine that although the primary function of "thermodynamics," can eventually process the query using all the equations, that only the enthalpy equations is needed. The processor may then segment the primary function of "thermodynamics" into the separate equations and proceed to only process the query with the enthalpy equation.

If at decision block 306, the processor determines that the primary function should not be segmented, the processor may process the query using the primary function and display a processed outcome of the query to the user. If, at decision block 306, the processor determines that the primary function should be segmented, the method 300 may proceed to operation 308.

At operation 308, the processor may segment the primary function into two or more subsidiary functions. In some embodiments, the method 300 may proceed to operation 310. At operation 310, the processor may process a portion of the query using one of the two or more subsidiary functions. In some embodiments, the method 300 may proceed to decision block 312, which will be discussed further in regard to FIG. 4.

At decision block 312, the processor may determine if each portion of the query has been processed. For example, the query may be split into three portions, each portion being associated with a subsidiary function associated with the primary function and two subsidiary functions acting as a trigger for one of the other subsidiary functions, or one subsidiary function acting as a trigger to display the processed outcome of the query.

In some embodiments, if the processor determines at decision block 312 that each portion of the query has not been processed, the processor may repeat operations 308, 310 and decision block 312 until each portion of the query has been processed. The processor may repeat operation 308, in order to determine if more subsidiary functions are needed to process the entirety of the query. In some embodiments, if the processor determines at decision block 312 that each portion of the query has been processed, the method 300 may proceed to operation 314. At operation 314, the processor may display a processed outcome of the query to the user. In some embodiments, after operation 314, the method 300 may end.

Figure 4:
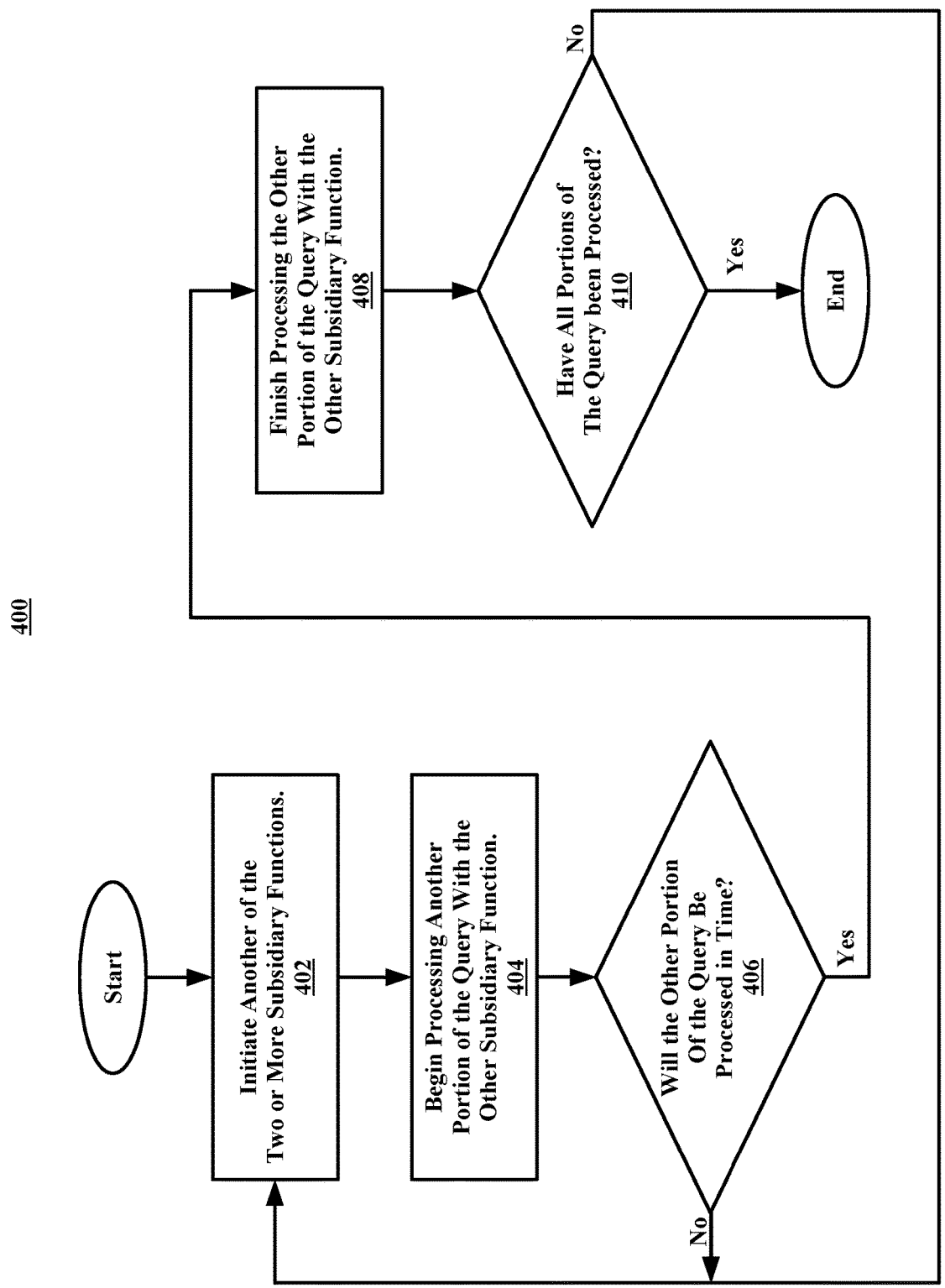
FIG. 4 illustrates a flowchart of an example method for determining if each portion of a query has been processed, in accordance with embodiments of the present disclosure.

Referring now to FIG. 4, illustrated is a flowchart of an example method 400 for determining if each portion of a query has been processed, in accordance with embodiments of the present disclosure. In some embodiments, the method 400 may begin at operation 402. At operation 402, the processor, as previously mentioned in regard to decision block 312 of FIG. 3, may initiate another of the two or more subsidiary functions (e.g., a second, third, fourth subsidiary function, etc.) after determining that each portion of the query has not yet been processed.

In some embodiments, the method 400 may proceed to operation 404. At operation 404, the processor may begin processing another portion of the query (e.g., a second, third, fourth portion, etc.) with the other subsidiary function. In some embodiments, the method 400 may proceed to decision block 406. In some embodiments, at decision block 406, the processor may determine if the other portion of the query will be processed within a certain time (e.g., a time constraint, a threshold, etc.). The certain time may be provided by a user to limit unnecessary waiting by the user. In some embodiments, a user may only desire an output to the query and may provide no time constraint for processing the query.

In some embodiments, the processor may determine if the other portion of the query will be processed within the certain time by executing the portion of the query using a subsidiary function and identifying if the query was processed within the certain time or not. In some embodiments, the processor may determine if the other portion of the query will be processed within the certain time by identifying that the portion of the query is too large to be processed within the certain time.

If, at decision block 406, it is determined by the processor that the other portion of the query will not be processed within the certain time, the processor may repeat operations 402, 404, and decision block 406. In some embodiments, the processor may repeat operations 402, 404, and decision block 406 because a user has input that there is not time constraint and that an output for the query is needed. That is, the processor may continue, to find an output indefinitely until an output is found or until the user explicitly stops the reiterating of operations 402, 404, and decision block 406. In some embodiments, if it is determined by the processor that the other portion of the query will not process within the certain time, the method 400 may end and the user may be provided with an "error" message indicating that an outcome to the query could not be produced within the certain time. This may allow the user to limit the time they spend on finding an outcome and move to another query.

In some embodiments, if, at decision block 406, it is determined by the processor that the other portion of the query will process within the certain time, the method 400 may proceed to operation 408.

At operation 408, the processor may finish processing the other portion of the query with the other subsidiary function. In some embodiments, the method 400 may proceed to decision block 410. At decision block 410 the processor may, again, regarding decision block 312 of FIG. 3, determine if all portions of the query have been processed. If, at decision block 410 it is determined that all portions of the query have not been processed, the processor may repeat operation 402, operation 404, decision block 406, operation 408, and decision block 410 (e.g., the entire method 400) until all portions of the query have been processed. In some embodiments, if it is determined by the processor at decision block 410 that all portions of the query have been processed, the method 400 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
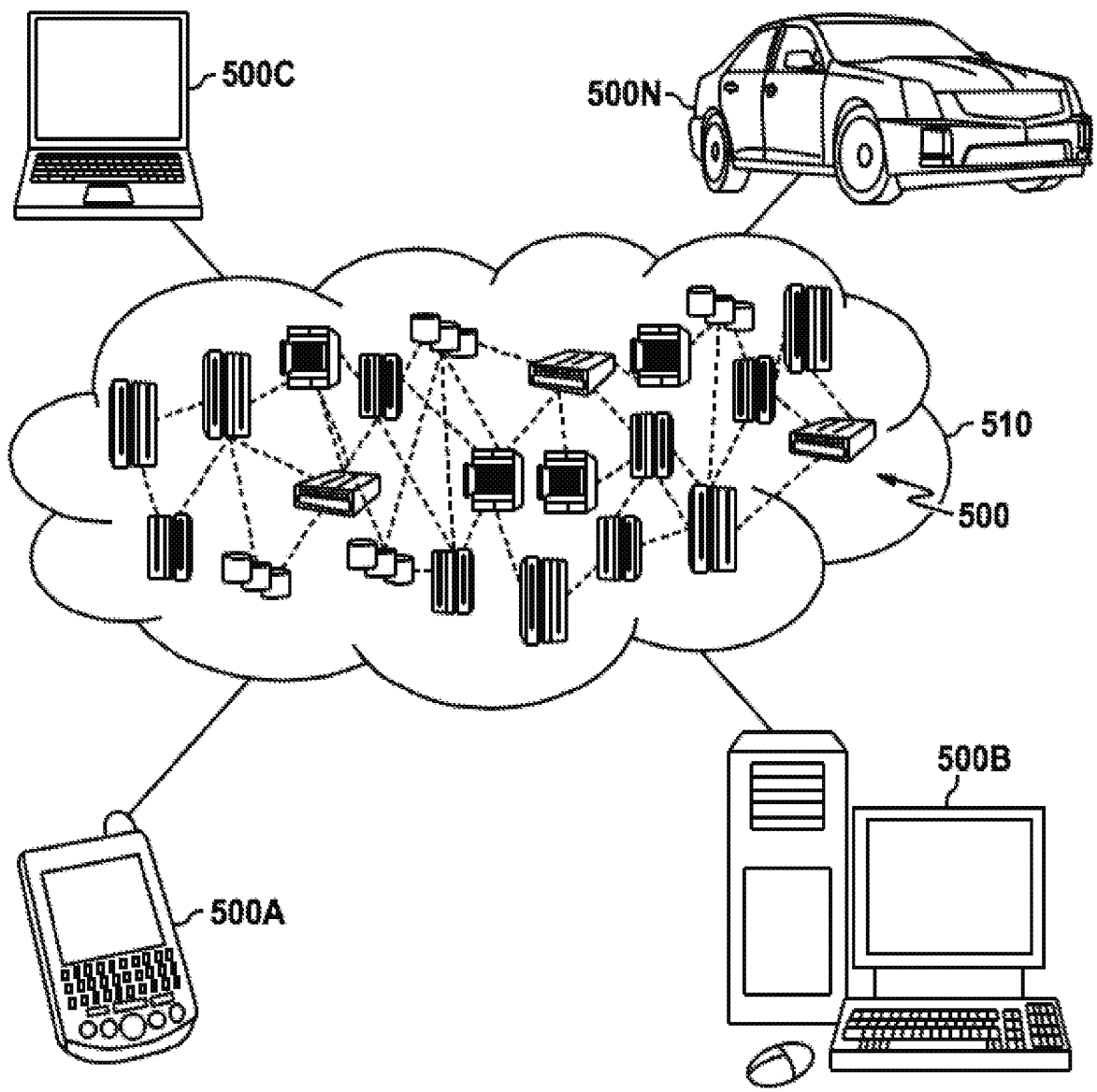
FIG. 5 depicts a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as Private, Community, Public, or Hybrid clouds as described hereinabove, or a combination thereof.

This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
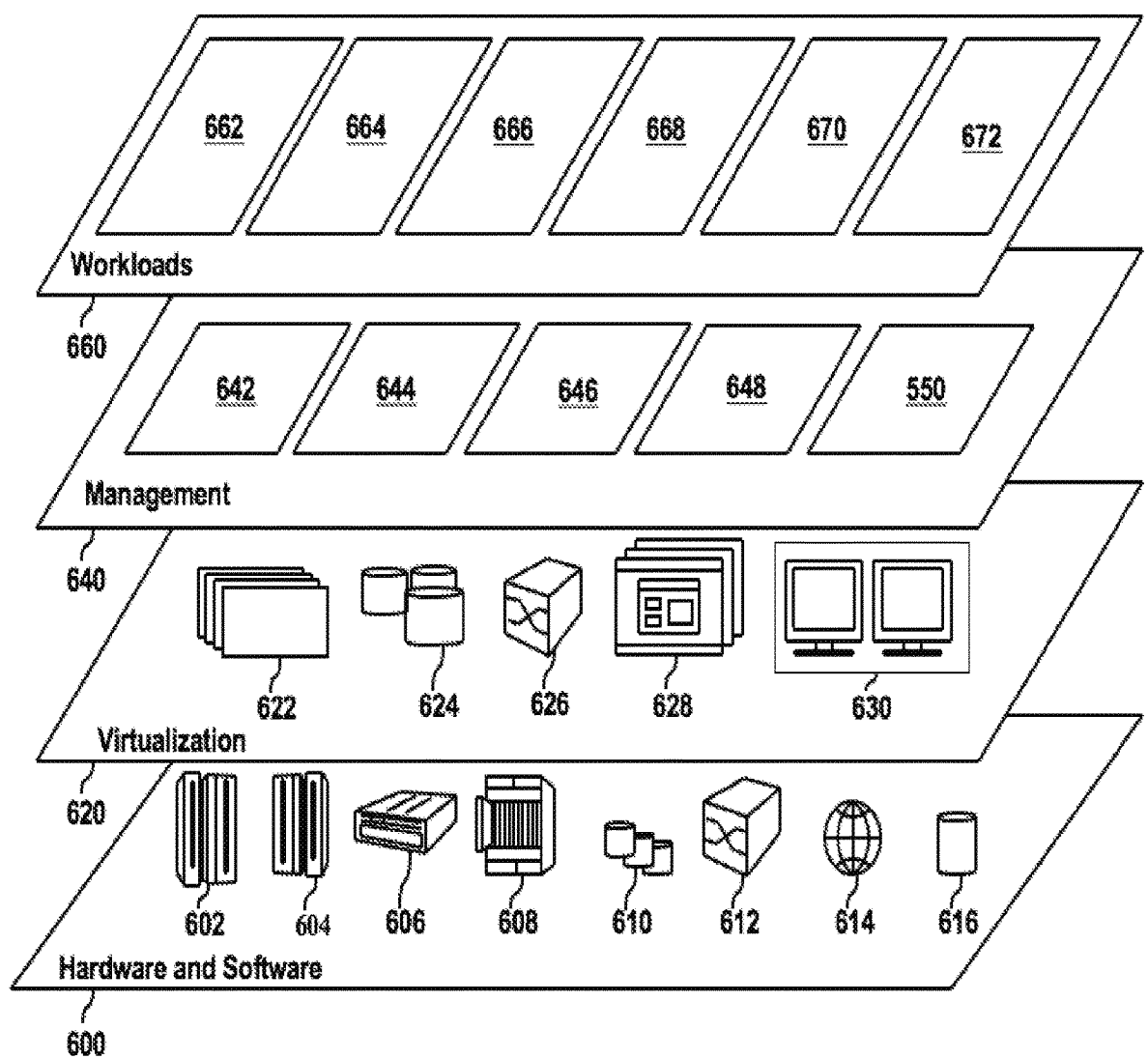
FIG. 6 depicts abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the invention are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 666; data analytics processing 668; transaction processing 670; and mobile desktop 672.

Figure 7:
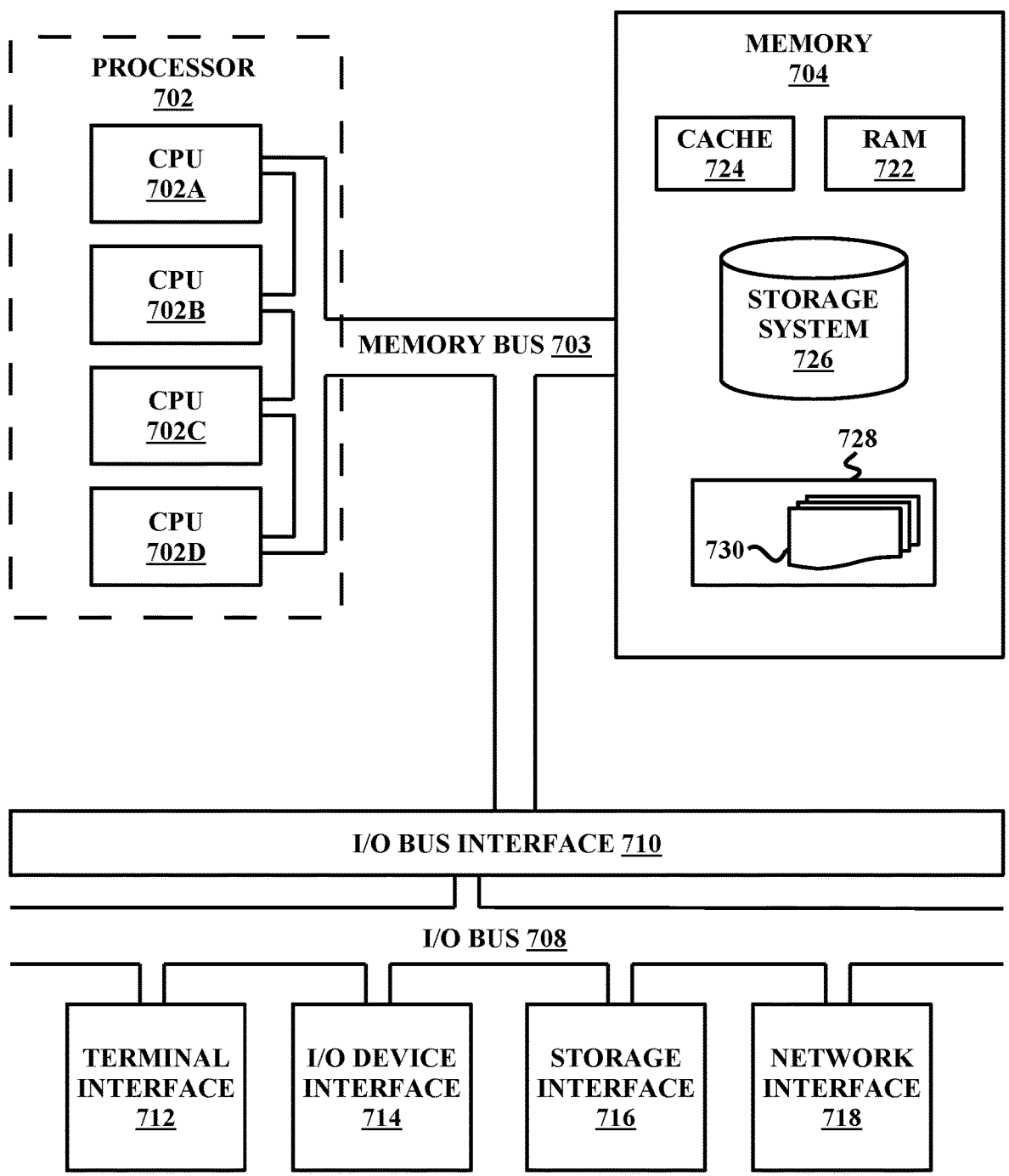
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   receiving, from a user, a query, wherein the query includes one or more portions;
   identifying, by a processor, a primary function, wherein the primary function is identified with a metadata tag indicating an association between the query and the primary function;
   segmenting the primary function into two or more subsidiary functions, wherein the two or more subsidiary functions use at least two different programming languages, selected by the processor, based on the processor determining the selected language allows for the query to be more efficiently processed;
   processing a first portion of the query with a first subsidiary function; and
   displaying a processed outcome of the query to the user.

2. The method of claim 1, further comprising:
   identifying that the first portion of the query has been processed by the first subsidiary function generating a first output;
   determining that a second portion of the query remains unprocessed; and
   processing the second portion of the query with a second subsidiary function.

3. The method of claim 2, wherein determining that the second portion of the query remains unprocessed comprises:
   identifying that the first output is a first input for the second subsidiary function.

4. The method of claim 3, further comprising:
   identifying that the second portion of the query has been processed by the second subsidiary function generating a second output;
   determining that a third portion of the query remains unprocessed;
   processing the third portion of the query with a third subsidiary function; and
   generating the processed outcome of the query.

5. The method of claim 1, wherein identifying the primary function comprises:
   accessing a database, wherein the database includes source code for one or more primary functions; and
   identifying the primary function as being able to process the query.

6. The method of claim 5, wherein identifying the primary function as being able to process the query comprises:
   identifying that the primary function has an identifier associated with a primary article of the query.

7. The method of claim 1, wherein determining to segment the primary function into two or more subsidiary functions comprises:
   determining that the primary function will not process the query within a time threshold.

8. The method of claim 1, wherein determining to segment the primary function into two or more subsidiary functions compromises:
   receiving a callback after completion of the primary function.

9. A system comprising:
   a memory; and
   a processor in communication with the memory, the processor being configured to perform operations comprising:
   receiving, from a user, a query, wherein the query includes one or more portions;
   identifying, by a processor, a primary function, wherein the primary function is identified with a metadata tag indicating an association between the query and the primary function;
   segmenting the primary function into two or more subsidiary functions, wherein the two or more subsidiary functions use at least two different programming languages, selected by the processor, based on the processor determining the selected language allows for the query to be more efficiently processed;
   processing a first portion of the query with a first subsidiary function; and
   displaying a processed outcome of the query to the user.

10. The system of claim 9, further comprising:
    identifying that the first portion of the query has been processed by the first subsidiary function generating a first output;
    determining that a second portion of the query remains unprocessed; and
    processing the second portion of the query with a second subsidiary function.

11. The system of claim 10, wherein determining that the second portion of the query remains unprocessed comprises:
    identifying that the first output is a first input for the second subsidiary function.

12. The system of claim 11, further comprising:
    identifying that the second portion of the query has been processed by the second subsidiary function generating a second output;
    determining that a third portion of the query remains unprocessed;
    processing the third portion of the query with a third subsidiary function; and
    generating the processed outcome of the query.

13. The system of claim 9, wherein identifying the primary function comprises:
    accessing a database, wherein the database includes source code for one or more primary functions; and
    identifying the primary function as being able to process the query.

14. The system of claim 13, wherein identifying the primary function as being able to process the query comprises:
    identifying that the primary function has an identifier associated with a primary article of the query.

15. A computer program product comprising a non-transitory computer readable storage medium having program instructions embodied therewith, the program instructions executable by a processor to cause the processor to perform a method, the method comprising:
    receiving, from a user, a query, wherein the query includes one or more portions;
    identifying, by a processor, a primary function, wherein the primary function is identified with a metadata tag indicating an association between the query and the primary function;
    segmenting the primary function into two or more subsidiary functions, wherein the two or more subsidiary functions use at least two different programming languages, selected by the processor, based on the processor determining the selected language allows for the query to be more efficiently processed;
    processing a first portion of the query with a first subsidiary function; and
    displaying a processed outcome of the query to the user.

16. The computer program product of claim 15, further comprising:

identifying that the first portion of the query has been processed by the first subsidiary function generating a first output;

determining that a second portion of the query remains unprocessed; and processing the second portion of the query with a second subsidiary function.

17. The computer program product of claim 16, wherein determining that the second portion of the query remains unprocessed comprises:

identifying that the first output is a first input for the second subsidiary function.

18. The computer program product of claim 17, further comprising:

identifying that the second portion of the query has been processed by the second subsidiary function generating a second output;

determining that a third portion of the query remains unprocessed;

processing the third portion of the query with a third subsidiary function; and generating the processed outcome of the query.

19. The computer program product of claim 15, wherein identifying the primary function comprises:

accessing a database, wherein the database includes source code for one or more primary functions; and identifying the primary function as being able to process the query.

20. The computer program product of claim 19, wherein identifying the primary function as being able to process the query comprises:

identifying that the primary function has an identifier associated with a primary article of the query.

* * * * *